United States Patent [19]

Remes

[11] Patent Number: 5,407,889
[45] Date of Patent: Apr. 18, 1995

[54] METHOD OF COMPOSITE SORBENTS MANUFACTURING

[75] Inventor: Victor P. Remes, Ekaterinburg, Russian Federation

[73] Assignee: Compomet Cantec, Moscow, Russian Federation

[21] Appl. No.: 104,138

[22] PCT Filed: Dec. 24, 1991

[86] PCT No.: PCT/SU91/00267

§ 371 Date: Aug. 19, 1993

§ 102(e) Date: Aug. 19, 1993

[87] PCT Pub. No.: WO93/12876

PCT Pub. Date: Jul. 8, 1993

[51] Int. Cl.⁶ ............................................. B01J 20/22
[52] U.S. Cl. .................................... 502/400; 502/401; 502/416; 502/417
[58] Field of Search ................ 502/400, 401, 416, 417

[56] References Cited

U.S. PATENT DOCUMENTS

| | | | |
|---|---|---|---|
| 4,448,711 | 5/1984 | Motojima et al. | 502/74 |
| 4,628,837 | 12/1986 | Mori et al. | 110/346 |
| 4,704,235 | 11/1987 | Arvesen | 134/2 |
| 4,755,322 | 7/1988 | Narbutt et al. | |
| 5,094,867 | 3/1992 | Detering et al. | 426/271 |

FOREIGN PATENT DOCUMENTS

3704046C2 1/1989 Germany.

OTHER PUBLICATIONS

Sbornik XIII Seminar "Khimia I Tekhnologia Neorganicheskikh Sorbentov", 1991 (Minsk), p. 33.
Sbornik IX Seminar "Khimia I Tekhnologia Neorganicheskikh Sorbentov", 1985 p. 18.
Sbornik "Khimia I Tekhnologia Neorganicheskikh Sorbentov", 1980, pp. 115-120.
Sbornik "Khimia I Tekhnologia Neorganicheskikh Sorbentov",1980, pp. 57-61.

*Primary Examiner*—Anthony McFarlane
*Attorney, Agent, or Firm*—Oblon, Spivak, McClelland, Maier & Neustadt

[57] ABSTRACT

This invention relates to a method of composite sorbents manufacturing on the basis of transition metal hexacyanoferrates and porous supporting materials. Sorbents, produced by this method have high efficiency recovery of cesium radionuclides (Up to 98,9%), strontium radionuclides (Up to 86,5%), thallium radionuclides (Up to 96,7%), low solubility in the water (less than 0,01%). Composite sorbents, produced by this method, have high efficiency in potable water cleaning to remove radionuclides, to add them into the daily diet of animals, because they decrease the quantity of cesium radionuclides in muscular tissue (in 10–12 times), in milk (in 10–20 times), and can be used for cleaning of AES secondary water.

11 Claims, No Drawings

METHOD OF COMPOSITE SORBENTS MANUFACTURING

INDUSTRIAL FIELD

This invention relates to a method of inorganic sorbents manufacturing, and to sorbents, produced by this method, which is to be applied to remove of the radioactive and stable isotopes of cesium, rubidium, thallium, strontium, alkaline earth elements and their analogues from aqueous solutions, and more particularly to a method of inorganic sorbents on the basis of transition metals of hexacyanoferrates manufacturing, having high selective abilities for cesium, rubidium, thallium and other metal ions, used to purify the aqueous solutions of cesium-137, strontium-90 and other toxic species.

BACKGROUND OF THE INVENTION

A number of methods of composite sorbents manufacturing on the basis of transition metal hexacyanoferrates is known.

The method in which organic polymer supporting material is treated alternately with inorganic acid and concentrated solution of copper salts and transition metal hexacyanorerrate is known. Three-four washings with the water is to be made in this method that results in forming of the large quantity of toxic wastes and great losses or the important initial materials. Sorbent produced by this method is not able to absorb strontium's ions (USSR, No. 778780, BOIj 19/04, 1980).

Also it's known the method in which the supporting material, preliminary saturated with a salt of transition metal during the heating, then dried, and after that treated by saturated solution of potassium hexacyanoferrate during the heating, washed and dried again. It takes a lot of time to complete all works with the hot solutions and as a result the great quantity of liquid toxic wastes appears to be. (USSR, No. 801871, BOIj 20/02, 1981).

The sorbents produced by these methods are not sufficiently effective, especially regarding to the recovery efficiency of cesium and strontium from solutions. Moreover, they have high degree of peptization in aqueous medium.

Another known method of the sorbent manufacturing is based on transition metal hexacyanoferrate and the porous supporting materials (U.S. Pat. No. 4,448,711, BOIj 27/24, 1984). In this method the porous supporting material is dipped in the solution of transition metal salt, then this supporting material is treated with aqueous solution of potassium hexacyanoferrate and after that is aged at different temperatures in the aqueous solution of high concentration sodium sulphate.

It takes a lot of time to carry out this method and a great volume of water for washing. The sorbents produced by this method have low specificity to strontium ions and significant peptization in the aqueous medium.

There are known some similar methods, one of them (USSR, No. 1012969, BOIj 20/00, 1983) offers to treat the mixture of alkaline metal and transition metal hexacyanoferrates by the solution or polyvinylchloride (PVC) resin in acetone with the subsequent distillation of the latter. In other method (EP, No. 217143, BOIj 39/02, 1983) of the composite sorbent manufacturing the powder of transition metal hexacyanoferrate has been added to the reaction mixture during the process of polycondensation of phenolformaldehyde matrix and then slowly dispersed in the hot oil. Both of above mentioned methods are technologically complicated, ecologically hazardous and have one disadvantage that in the beginning it's necessary to produce, to dry, to grind and to sieve transition metal hexacyanoferrate.

The most close to the object of this invention, regarding to technical essence and the result achieved, is the method of hexacyanoferrate sorbent manufacturing that incorporates the porous supporting material (coal, wood, etc.) treatment with fresh prepared mixture of solutions 90 g/l of potassium hexacyanoferrate (3+) with 145 g/l of iron nitrate (3+) in equal volumes. After the treatment of the supporting, material with the above mixture, the produced substance is washed by water. This procedure is to be repeated 3-5 times. (Chemistry and Technology of Inorganic Sorbents. Intercollege Scientific Transactions. Polytechnic Institute of Permj, 1979, pp. 71-74). Taking into account all positive subjects of this method it should be mentioned that recovery efficiency of produced sorbents to cesium ions doesn't excess 85; the method requires the great amount of reagents resulting in low yield efficiency of the finished product (For the triple treatment of one liter of sorbent more than 400g of potassium hexacyanoferrate and 650 g of iron nitrate are consumed); the volume of liquid wastes is significant (Up to 10 liters of industrial water containing one g/l of iron hexacyanoferrate and 10 g/l of potassium nitrate are formed after the treatment of one liter of sorbent); the sorbent produced by this method has low stability in aqueous solutions (7,2%). Moreover, this sorbent doesn't extract strontium ions.

SUMMARY OF THE INVENTION

The cardinal object of this invention is to provide a waste limited, dangerless from ecological point of view and a simple method of composite sorbent manufacturing on the basis of transition metal hexacyanoferrates. The object of this invention is to increase the recovery efficiency of cesium, rubidium, strontium ions by the sorbents and rising of their stability in aqueous solutions.

This object is realized by the treatment of the porous granulated or fibrous supporting material with suspension which has been produced by mixing of solutions of transition metal salt with alkaline metal hexacyanoferrate; the solution of salts of transition metal consists of a metal with different oxidation level, such that ratio of a metal with the highest oxidation level to a metal with the lowest oxidation level is within the range from 1,0 to 0,01.

The suspension produced by this method is an unequilibrium system, because it contains the mixture of some transition metal hexacyanoferrates of different chemical compositions, has high activity and intensively reacts with the surface of supporting material, used for preparation of the composite sorbent. As a result of interaction of suspension and supporting material on the surface of the latter the strong coating with hexacyanoferrate is formed with s great number of structural defects which have high sorption activity.

Produced suspension is a mixture of solutions of salts of transition metals, which have the ratio of quantity of transition metal with the highest oxidation level to the quantity of transition metal with the lowest oxidation level within the range from 1,0 to 0,01, with alkaline metal hexacyanoferrate; this mixture has a very high regeneration capacity. After treatment of a porous supporting material with this suspension and necessary drying at 90°–110° C. temperature, metal with the lowest oxidation level is oxidized by the ambient air to the highest oxidation level and phase $M_x^1M_y^2[Fe(CN)_6]$ of the transition metal hexacyanoferrate has been formed on this stage, where $M^1$—is the transition metal such as iron, nickel, copper, cobalt, chromium, titanium; $M^2$—alkaline metal such as sodium, potassium, lithium, ammonia.

Experiments have shown that hexacyanoferrates of such composition had cubic structure with the size of crystal lattice crossover of 0,35 nm, high stability in aqueous solutions and high mechanical strength. The extremely high increasing of the number of crystal lattice defects and corresponding increasing of the sorption capacity has been observed when solutions of metal salts had the ratio metal of the highest oxidation level to metal of the lowest oxidation level within the range from 0,1 to 0,01.

Mobility of $M^2$ metal inside of crystal lattice of such composition of hexacyanoferrates as well as appearance sorption centers due to high defectness of lattice, provide distribution coefficient for cesium in this sorbent from aqueous solutions, such as sea water, up to the $10^6$ ml/g of sorbent concentration.

To improve specificity of composite sorbent to strontium ions and it's analogues, the phosphate ions should be added into the alkaline metal hexacyanoferrate solution. After the treatment of supporting material with the suspension it should be dried at temperature 90°–110° C. The volume of inorganic ion exchanger in the total volume of produced composite sorbent is 1–30%.

PREFERRED EMBODIMENT OF THE INVENTION

The method of composite sorbents manufacturing on the basis of transition metal hexacyanoferrates as well as sorbents, produced by this method, will be more apparent through the following specific examples:

Examples 1–17

300 ml of the solution, which contains 110 g/l of potassium hexacyanoferrate (3+) and 5 g/l of orthophosphorous acid, are added to the 300 ml of solution, containing 70 g/l of iron sulphate of different oxidation levels. 150 g of supporting material (granulated wood cellulose) are treated with this suspension, mixed and dried at the temperature 90° C. Sorbent, obtained from the solution, which has different ratio of Iron (3+) to Iron (2+) in the iron sulphate, in case of 30% of ion exchanger substance has demonstrated properties shown in the Table 1.

TABLE 1

| No. | Ratio in primary solution iron sulphite (3+) / iron sulphite (2+) | Peptization, % | Recovery efficiency, % Cs | Sr | Tl |
|---|---|---|---|---|---|
| 1 | 0,008 | 0,04 | 97,9 | 68,4 | 88,1 |
| 2 | 0,01 | <0,01 | 98,7 | 81,8 | 95,0 |
| 3 | 0,03 | <0,01 | 98,6 | 81,7 | 95,1 |
| 4 | 0,05 | <0,01 | 98,8 | 82,7 | 95,4 |
| 5 | 0,07 | <0,01 | 98,6 | 81,9 | 96,6 |
| 6 | 0,09 | <0,01 | 98,8 | 82,6 | 95,4 |
| 7 | 0,13 | <0,01 | 98,2 | 80,9 | 94,9 |
| 8 | 0,17 | <0,01 | 98,3 | 81,3 | 95,0 |
| 9 | 0,21 | <0,01 | 98,4 | 81,4 | 93,9 |
| 10 | 0,25 | <0,01 | 98,0 | 81,0 | 95,0 |
| 11 | 0,30 | <0,01 | 98,5 | 80,9 | 95,0 |
| 12 | 0,40 | <0,01 | 98,2 | 81,2 | 95,0 |

TABLE 1-continued

| No. | Ratio in primary solution iron sulphite (3+) / iron sulphite (2+) | Peptization, % | Recovery efficiency, % Cs | Sr | Tl |
|---|---|---|---|---|---|
| 13 | 0,50 | <0,01 | 98,4 | 81,1 | 94,7 |
| 14 | 0,65 | <0,01 | 98,2 | 81,4 | 94,1 |
| 15 | 0,80 | <0,01 | 98,4 | 81,4 | 94,7 |
| 17 | 1,10 | <0,01 | 96,7 | 71,9 | 90.7 |

Peptization value was determined according to the following procedure: 10 g of sorbent having been mixed with 500 ml of distilled water for one hour. After sorbent filtering out the volume of metal hexacyanoferrate in the water has been measured and it's loss after peptization per 1 g of sorbent as a percentage of initial volume has been counted.

Recovery efficiency was calculated as following: 500 mg of the sorbent were placed into one liter of 0,5M sodium chloride solution, containing additionally 0,01 mg of cesium, strontium or thallium, and radioactive indicator as the corresponding isotope. This mixture was mixed till the sorption equilibrium has been achieved. Recovery efficiency has been calculated according to the changes of the activity.

Examples 18–32

300 ml of the solution, containing 100 g/l copper chloride with different quantity range of copper (2+) to copper(1+) are added to 300 ml of the solution which contains 100 g/l potassium hexacyanoferrate (3+), 100 g/l potassium hexacyanoferrate (2+), 15 g/l potassium phosphate. 80 g of supporting fibrous material (cotton cellulose) were treated by above suspension, mixed and dried at the temperature 90° C. Sorbent obtained from the solution, that has different ratio of copper(2+) to copper(1+) in the copper chloride, in case of 12,5% of ion exchanger substance or the composite sorbent has demonstrated the properties shown in the Table 2.

TABLE 2

| No. | Ratio in primary solution copper chloride (2+) / copper chloride (1+) | Pestization, % | Recovery efficiency, % Cs | Sr | Tl |
|---|---|---|---|---|---|
| 18 | 0,008 | 0,1 | 94,2 | 80,2 | 89,2 |
| 19 | 0,04 | 0,08 | 95,2 | 82,1 | 90,8 |
| 20 | 0,10 | <0,01 | 97,0 | 84,5 | 95,0 |
| 21 | 0,15 | <0,01 | 97,2 | 84,7 | 95,2 |
| 22 | 0,20 | <0,01 | 97,9 | 85,8 | 95,4 |
| 23 | 0,25 | <0,01 | 97,8 | 85,2 | 95,4 |
| 24 | 0,30 | <0,01 | 97,4 | 85,2 | 95,4 |
| 25 | 0,35 | <0,01 | 97,3 | 85,0 | 95,3 |
| 26 | 0,40 | <0,01 | 97,1 | 84,9 | 95,3 |
| 27 | 0,45 | <0,01 | 97,0 | 84,5 | 95,0 |
| 28 | 0,50 | <0,01 | 95,8 | 82,2 | 93,1 |
| 29 | 0,60 | <0,01 | 95,3 | 80,0 | 91,7 |
| 30 | 0,75 | <0,01 | 95,0 | 80,0 | 90,9 |
| 31 | 0,90 | <0,01 | 94,1 | 79,9 | 90,2 |
| 32 | 1,10 | <0,04 | 93,8 | 79,0 | 89,6 |

Examples 33–48

300 ml of the solution, containing 100 g/l titanium sulphate with different quantity range of titanium (4+) to titanium(3+) were added 300 ml of the solution which contains 200 g/l potassium hexacyanoferrate (2+) and 30 g/l potassium phosphate. 500 g of activated carbon (BAY-type, according to Russian Standard)

were treated by above suspension, mixed and dried at the temperature 110° C. Sorbent, obtained from the solution, which has different ratio of titanium(4+) to titanium(3+) in the titanium sulphate, in case of the 10,4% of ion exchanger substance has demonstrated the properties shown in the Table 3.

TABLE 3

| No. | Ratio in primary solution titanium sulphate (4+) / titanium sulphite (3+) | Pestization, % | Recovery efficiency, % | | |
|---|---|---|---|---|---|
| | | | Cs | Sr | Tl |
| 33 | 0,008 | 0,06 | 93,0 | 82,1 | 92,2 |
| 34 | 0,04 | 0,02 | 94,2 | 82,3 | 93,0 |
| 35 | 0,10 | <0,01 | 95,0 | 82,4 | 94,2 |
| 36 | 0,16 | <0,01 | 96,6 | 82,4 | 95,0 |
| 37 | 0,20 | <0,01 | 96,7 | 83,5 | 95,2 |
| 38 | 0,22 | <0101 | 97,1 | 83,7 | 95,6 |
| 39 | 0,24 | <0,01 | 97,4 | 84,0 | 96,0 |
| 40 | 0,26 | <0,01 | 97,4 | 84,1 | 96,7 |
| 41 | 0,30 | <0,01 | 97,1 | 84,0 | 95,5 |
| 42 | 0,35 | <0,01 | 96,9 | 83,8 | 95,2 |
| 43 | 0,40 | <0,01 | 96,8 | 83,7 | 95,0 |
| 44 | 0,45 | <0,01 | 96,5 | 83,6 | 94,4 |
| 45 | 0,50 | <0,01 | 96,3 | 83,2 | 94,2 |
| 46 | 0,70 | <0,01 | 95,0 | 83,0 | 94,0 |
| 47 | 0,90 | <0,04 | 94,6 | 82,6 | 93,6 |
| 48 | 1,10 | <0,01 | 94,0 | 82,0 | 92,8 |

Example 49

200 ml of the solution, containing, 400 g/l iron chloride with ratio iron(3+) to iron(2+)=1, were added to 500 ml of the solution which contains 200 g/l potassium hexacyanoferrate (3+) and 50 g/l potassium phosphate. 1000 g of supporting material (pine-wood sawdust) were treated by above suspension, mixed and dried at the temperature 110° C. Samples's properties are shown in the Table 4.

Comparative Characteristics of Sorbents

TABLE 4

| No. | Method of manufacturing | Volume, % of ion exchanger | Peptization, % | Recovery efficiency, % | | |
|---|---|---|---|---|---|---|
| | | | | Cs | Sr | Tl |
| 1 | Prototype | 42,0 | 7,2 | 84,5 | 6,2 | 68,5 |
| 2 | Example 6 | 30,0 | <0,01 | 98,8 | 82,6 | 95,4 |
| 3 | Example 22 | 12,5 | <0,01 | 97,9 | 85,8 | 95,4 |
| 4 | Example 40 | 10,4 | <0,01 | 97,4 | 84,1 | 96,7 |
| 5 | Example 49 | 14,5 | <0,01 | 98,9 | 86,5 | 94,2 |

Industrial Applicability

As shown in the Tables 1-4, all sorbents have high sorption capacity regarding to the ions of cesium, strontium and thallium, high stability in aqueous systems and good kinetics of ion exchanging. Sorption equilibrium time did not excess 1 hour because the active sorbing inorganic ion exchanger which has great number of sorbing centers is located on the surface of supporting material and easily contacts with ions to be extracted.

After drying all composite sorbents may be used for cleaning of waste water from AES or Chemical Plants, that have high salt background of toxic and radioactive substances, as well as for solution of the analytical and radiochemical problems. To use the sorbents for the purposes of potable water and foods cleaning, the additional their washing is necessary to achieve the definite purity level for any concrete consuming.

The sorbents, manufactured by this method, are very perspective for the cleaning or waste water and processing solutions from AES, when they are contaminated by cesium, strontium and other radionuclides (one volume of sorbent is able to clean 3 thousand of the same volume of secondary water and up to 10 thousand of solutions, formed during the the process of regeneration of cations filters).

These sorbents are very effective for express-analysis of natural water, sea water, tap water, milk and other different foods to detect the presence and to determine the quantity of cesium radioisotopes (The analysis sensibility can be increased up to 10 thousand times).

Sorbents on the basis of iron, manufactured by this method, if used for radioactively contaminated daily diet, give the opportunity to decrease volume of radioactive cesium in muscular tissues of the animals in 10-12 times, in the interior organs—in 25-90 times, in the milk—in 10-20 times. As to radioactive strontium it's volume may be decreased in the animal bodies up to 2 times, in milk—3-4 times.

I claim:

1. A method of composite sorbent manufacture, comprising treating a porous supporting material with a mixture including a hexacyanoferrate substance, to obtain a treated supporting material; and drying said treated supporting material, wherein said hexacyanoferrate substance is a suspension obtained by mixing an alkaline metal hexacyanoferrate solution of potassium hexacyanoferrate (2+) and/or potassium hexacyanoferrate (3+), with a solution of salts of transition metals which have different oxidation levels.

2. A method according to claim 1, characterized in that said solution of salts of transition metals consists of salts of iron, nickel, copper, cobalt, chromium and titanium.

3. A method according to claim 2, wherein said solution of salts is a mixture of solutions of salts of transition metals in which the ratio of the quantity of transition metal with the highest oxidation level to the quantity of transition metal with the lowest oxidation level is within the range of 1.0 to 0.01.

4. A method according to any of claims 1, 2, or 3, characterized in that up to 5% of phosphate anions are added to the solution of alkaline metal hexacyanoferrate.

5. A method according to any of claims 1, 2, or 3, wherein said drying is carried out at a temperature of 90°-110° C.

6. A method according to any of claims 1, 2, or 3, wherein an active ion exchanger material is used in a volume of 1-30% of the total volume of manufactured composite sorbent.

7. A composite sorbent, produced by treating a porous supporting material with an aqueous suspension obtained by mixing a potassium hexacyanoferrate solution with a solution of an iron salt, wherein said iron salt solution contains iron of a level of oxidation (3+) and an oxidation level (2+) in the range of 0.01-0.1; and the composite sorbent containing 1-30% iron hexacyanoferrate has a recovery efficiency for cesium of up to 98.8% and for thallium of up to 95.4%, with a degree of peptization of less than 0.01%.

8. A composite sorbent according to claim 7, characterized by adding 0.1-5 mass % of orthophosphoric acid of strontium recovery efficiency of up to 86.6% and with a degree of peptization of less than 0.01%.

9. A composite sorbent, produced by treating a porous supporting material with an aqueous suspension obtained by mixing a potassium hexacyanoferrate solution with a solution of copper salt, wherein said copper salt solution contains copper with a level of oxidation (2+) and an oxidation level (1+) in the range of 0.01–0.5; and the composite sorbent containing 1–20% copper hexacyanoferrate with a recovery efficiency for cesium of up to 97.8% and for strontium of up to 85.8% and for thallium of up to 95.4%, with a degree of peptization of less than 0.01%.

10. A composite sorbent, produced by treating a porous supporting material with an aqueous suspension obtained by mixing a potassium hexacyanoferrate solution with a solution of titanium salts, wherein said titanium salt solution contains titanium with a level of oxidation (4+) and an oxidation level (3+) in the range of 0.2–0.5; and the composite sorbent containing 1–25% titanium hexacyanoferrate with a recovery efficiency for cesium of up to 97.4%, for strontium of up to 84.1% and for thallium of up to 96.7% at a level of peptization of less than 0.01%.

11. A method according to claim 2, wherein said solution of salts is a mixture of solutions of salts of transition metals in which the ratio of the quantity of transition metal with the highest oxidation level to the quantity of transition metal with the lowest oxidation level is within the range of 0.1 to 0.01.

* * * * *

UNITED STATES PATENT AND TRADEMARK OFFICE
CERTIFICATE OF CORRECTION

PATENT NO. : 5,407,889

DATED : April 18, 1995

INVENTOR(S): Victor P. REMEZ

It is certified that an error appears in the above-identified patent and that said Letters Patent is hereby corrected as shown below:

```
On the title page, add item [19] --Remez--
 On the title page, item [75] inventor, change"Victor P. Remes"
```
   to-- Victor P. REMEZ--.

Signed and Sealed this

Eleventh Day of July, 2000

Attest:

Q. TODD DICKINSON

*Attesting Officer*      *Director of Patents and Trademarks*